United States Patent
Santamaria et al.

(10) Patent No.: US 8,757,198 B2
(45) Date of Patent: Jun. 24, 2014

(54) SPRING RETAINING SLEEVE

(75) Inventors: Angelo Santamaria, Kernen (DE); Jochen Aleker, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 901 days.

(21) Appl. No.: 12/991,307

(22) PCT Filed: Mar. 6, 2009

(86) PCT No.: PCT/EP2009/052684
§ 371 (c)(1),
(2), (4) Date: Nov. 5, 2010

(87) PCT Pub. No.: WO2009/135710
PCT Pub. Date: Nov. 12, 2009

(65) Prior Publication Data
US 2011/0089359 A1 Apr. 21, 2011

(30) Foreign Application Priority Data
May 6, 2008 (DE) .......................... 10 2008 001 572

(51) Int. Cl.
*F16K 15/02* (2006.01)
(52) U.S. Cl.
USPC ......... 137/493.9; 137/540; 251/337; 251/355
(58) Field of Classification Search
USPC ............... 251/337, 355; 137/493.9, 539, 540, 137/543; 123/446
See application file for complete search history.

(56) References Cited

U.S. PATENT DOCUMENTS

| | | | | |
|---|---|---|---|---|
| 1,482,478 A | * | 2/1924 | Milligah | 251/355 |
| 1,694,978 A | * | 12/1928 | Harper | 251/355 |
| 2,224,447 A | * | 12/1940 | Penick et al. | 251/355 |
| 5,267,723 A | * | 12/1993 | Shea et al. | 251/359 |
| 5,950,932 A | * | 9/1999 | Takeda et al. | 251/129.21 |
| 6,244,295 B1 | * | 6/2001 | Bartussek et al. | 251/337 |
| 6,447,565 B1 | * | 9/2002 | Raszkowski et al. | 220/371 |
| 6,497,247 B1 | | 12/2002 | Kinoshita et al. | |
| 6,834,667 B2 | * | 12/2004 | Sumiya et al. | 251/129.21 |
| 7,104,273 B1 | * | 9/2006 | Stafford | 137/15.17 |
| 2002/0062866 A1 | | 5/2002 | Sumiya et al. | |
| 2005/0051218 A1 | | 3/2005 | Oba et al. | |
| 2006/0196553 A1 | | 9/2006 | Kane | |
| 2007/0220747 A1 | * | 9/2007 | Akabane | 29/888.4 |
| 2008/0190492 A1 | | 8/2008 | Fuchs et al. | |

FOREIGN PATENT DOCUMENTS

| | | |
|---|---|---|
| DE | 10158503 A1 | 8/2002 |
| DE | 102005024042 A1 | 11/2006 |
| DE | 102005055360 A1 | 5/2007 |
| EP | 0800100 A1 | 10/1997 |
| EP | 1467086 A1 | 10/2004 |
| GB | 592524 A | 9/1947 |
| JP | 2006009705 | 1/2006 |
| WO | 2004083696 A1 | 9/2004 |

* cited by examiner

*Primary Examiner* — John Bastianelli
(74) *Attorney, Agent, or Firm* — Michael Best & Friedrich LLP

(57) ABSTRACT

A spring retaining sleeve includes a cylinder press-fit connection surface which has a press-fit diameter and a press-fit length. To enable cost-effective production of a stable press-fit assembly, at least one end of the cylinder press-fit connection surface, an optimized insertion chamfer for long press-fit assemblies is provided with a ratio of press-fit diameter to press-fit length of greater than thirty five percent.

6 Claims, 4 Drawing Sheets

SPRING RETAINING SLEEVE

CROSS-REFERENCE TO RELATED APPLICATION

This application is a 35 USC 371 application of PCT/EP2009/052684 filed on Mar. 6, 2009.

BACKGROUND OF THE INVENTION

Field of the Invention

The invention relates to a spring retaining sleeve having a cylinder press-fit connection surface, which has a press-fit diameter and a press-fitting length.

The spring retaining sleeve is part of a high-pressure fuel valve in a high-pressure fuel pump, with a receiving bore for the high-pressure fuel valve. In the receiving bore, a valve closing body of the high-pressure fuel valve is received movably back and forth counter to the prestressing force of a valve spring. The valve spring is fastened between the valve closing body and the spring retaining sleeve that is press-fitted into the receiving bore.

OBJECT AND SUMMARY OF THE INVENTION

The object of the invention is to create a spring retaining sleeve which makes economical production of a stable press-fit assembly possible.

In a spring retaining sleeve having a cylinder press-fit connection surface, which has a press-fit diameter and press-fitting length, the object is attained in that on at least one end of the cylinder press-fit connection face, an optimized insertion chamfer is provided, for long press-fit assemblies having a ratio of press-fit diameter to press-fitting length that is greater than 35 percent. The cylinder press-fit connection surface essentially has the shape of a rectilinear circular-cylindrical jacket, which is press-fitted with an oversize into the likewise circular-cylindrical jacket-like receiving chamber for the spring retaining sleeve. Because of the optimized insertion chamfer, a relatively long, elastic press-fit assembly which makes it possible to absorb major flow forces, is created in a simple way. In the context of the invention it was discovered that especially with long press-fit assemblies, unavoidable coaxiality errors between the insertion diameter and the press-fit diameter have an especially adverse effect. If the cylinder press-fit connection surface is not constant, jittering effects and finally seizing marks can occur during the press-fitting operation. Complicated minimization of the coaxiality errors can be dispensed with as a result of the optimized insertion chamfer.

One preferred exemplary embodiment of the spring retaining sleeve is characterized in that the insertion chamfer has an angle which is in a range from 18 to 22 degrees. In the context of the present invention it was discovered that in relatively long press-fit assemblies, in comparison to the insertion chamfer angle of 5 degrees, for instance, the indicated angle or range makes a pronounced reduction of unwanted jittering and seizing effects during a press-fitting operation possible.

A further preferred exemplary embodiment of the spring retaining sleeve is characterized in that the insertion chamfer has an angle that amounts to 20 degrees plus or minus degrees. This insertion chamfer angle has proved to be especially advantageous in the context of the present invention.

In a spring retaining sleeve having a cylinder press-fit connection surface, which has a press-fit diameter and a press-fitting length, in particular a spring retaining sleeve as described above, the above-stated object is also attained in that the cylinder press-fit connection surface has at least one lubrication groove. The cylinder press-fit connection surface essentially has the shape of a rectilinear circular-cylindrical jacket, which is press-fitted with an oversize and to the likewise circular-cylindrical jacket-like receiving chamber for the spring retaining sleeve. By means of the lubrication groove, a uniform supply of lubricant as the spring retaining sleeve is press-fitted in can be ensured. The lubrication groove creates a lubricant reservoir, which dispenses lubricant during the press-fitting operation and thereby provides for virtually constant friction.

A further preferred exemplary embodiment of the spring retaining sleeve is characterized in that the lubrication groove extends in the circumferential direction. The lubrication groove is preferably an encompassing annular groove.

A further preferred exemplary embodiment of the spring retaining sleeve is characterized in that the lubrication groove, in cross section, has the shape of a circular arc. This shape has proved to be especially advantageous in the context of the present invention.

A further preferred exemplary embodiment of the spring retaining sleeve is characterized in that the lubrication groove is disposed in the center of the cylinder press-fit connection surface. It is also possible for a plurality of lubrication grooves to be disposed centrally or symmetrically offset from one another.

Further advantages, characteristics, and details of the invention will become apparent from the ensuing description, in which various exemplary embodiments are described in detail in conjunction with the drawings.

DESCRIPTION OF THE PREFERRED EMBODIMENTS

Figure 1:
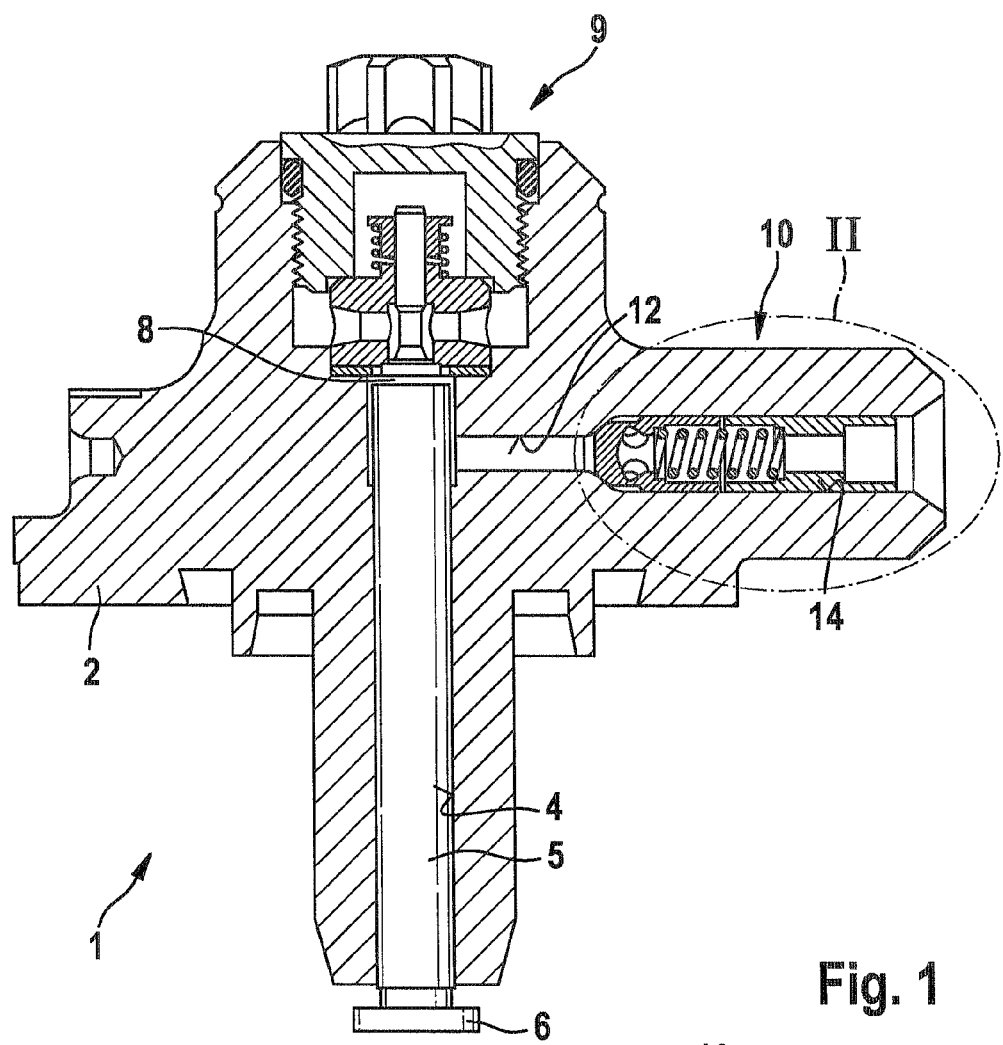
FIG. 1 shows a cylinder head of a high-pressure fuel pump in section.

In FIG. 1, a cylinder head 2 of a high-pressure fuel pump 1 is shown in section. The cylinder head 2 includes a cylinder bore 4, in which a high-pressure piston 5 is received movably back and forth. The high-pressure piston 5, on one end, has a piston base 6, which is driven, for example by a drive cam of a drive shaft (not shown).

In the cylinder bore 4, the other end of the high-pressure piston 5 defines a high-pressure chamber 8, which is filled with fuel via a suction valve 9. The fuel is subjected to high pressure in the high-pressure chamber 8 by the high-pressure piston 5 and is delivered via a high-pressure valve 10, for instance to a fuel injection system of an internal combustion engine. The high-pressure valve 10 is disposed in a receiving bore 14 in the cylinder head 2. The receiving bore 14 communicates with the high-pressure chamber 8 via a high-pressure conduit 12.

Figure 2:
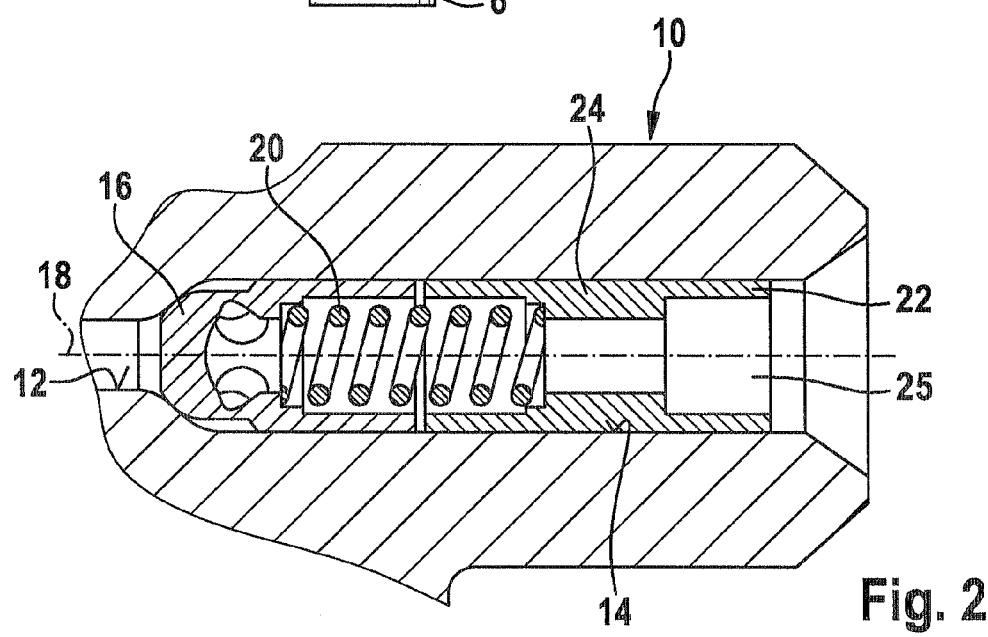
FIG. 2 shows an enlarged detail II of FIG. 1.

In FIG. 2, the detail II of FIG. 1 having the high-pressure valve 10 is shown on a larger scale. In the enlarged view, it can be seen that a valve closing body 16 is guided, movably back and forth, in the receiving bore 14. The valve closing body 16 serves to keep a valve seat closed or to open it intentionally, so as to carry away fuel, subjected to high pressure, from the high-pressure chamber 8 via the high-pressure valve 10. For that purpose, the closing body 16 is movable back and forth along a longitudinal axis 18, counter to the prestressing force of a valve spring 20.

The valve spring 20 is braced on and guided in a spring retaining sleeve 22. The spring retaining sleeve 22 includes a base body 24 with a central through hole 25 and is press-fitted into the receiving bore 14 in the cylinder head 2.

Figure 3:
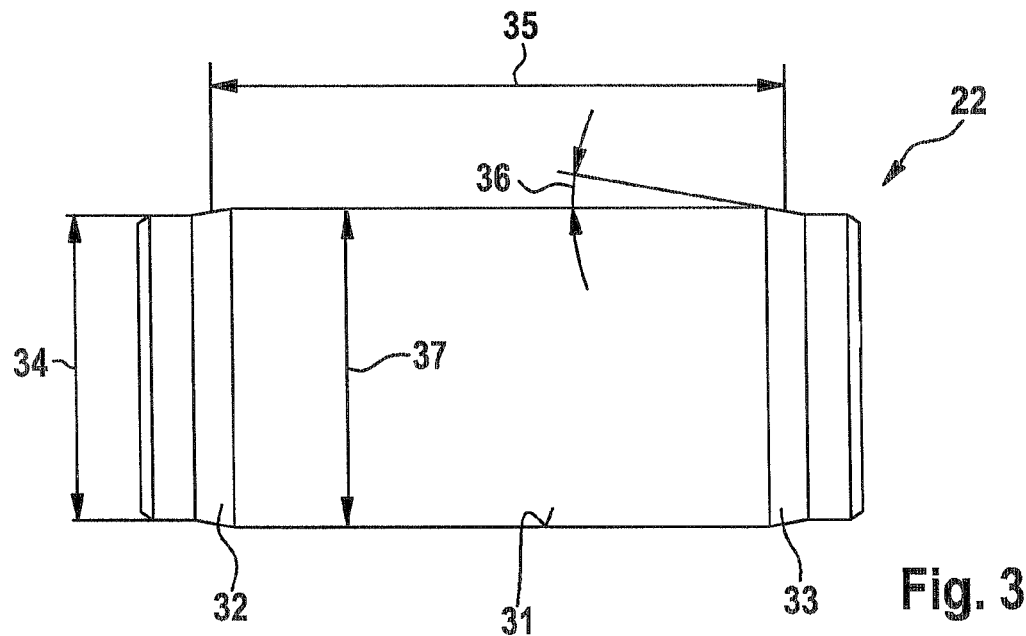
FIG. 3 shows a spring retaining sleeve having an insertion chamfer of 5 degrees.
Figure 4:
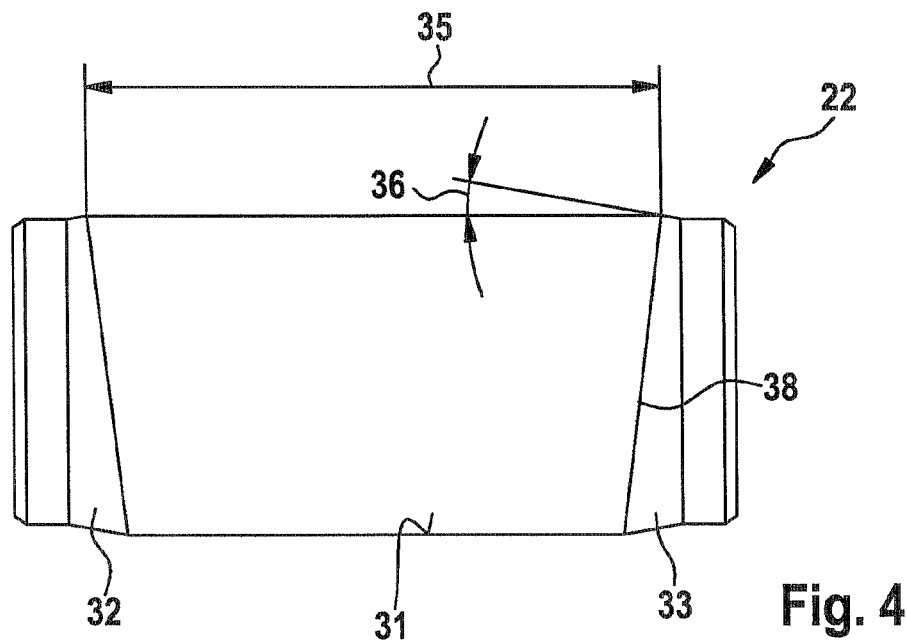
FIG. 4 shows the spring retaining sleeve of FIG. 3 showing the influence of a coaxiality error.

In FIGS. 3 and 4, the spring retaining sleeve 22 is shown with a cylinder press-fit connection surface 31, which essentially has the shape of a rectilinear circular-cylindrical jacket. One insertion chamfer 32, 33 is provided on each of the ends of the cylinder press-fit connection surface 31. The press-fit diameter is indicated by a dimensioning line 34. The press-fitting length of the cylinder press-fit connection surface 31 is indicated by a further dimensioning line 35.

An insertion chamfer angle of the insertion chamfer 33 is marked 36. The insertion chamfer angle 36 has a size of 5 degrees plus or minus 1 degree in FIGS. 3 and 4. The insertion diameter is indicated by a further dimensioning line 37. In the exemplary embodiment shown in FIG. 3, the coaxiality error is equal to zero. In FIG. 4, the effect of a coaxiality error of 0.025 is illustrated by a line 38.

Figure 5:
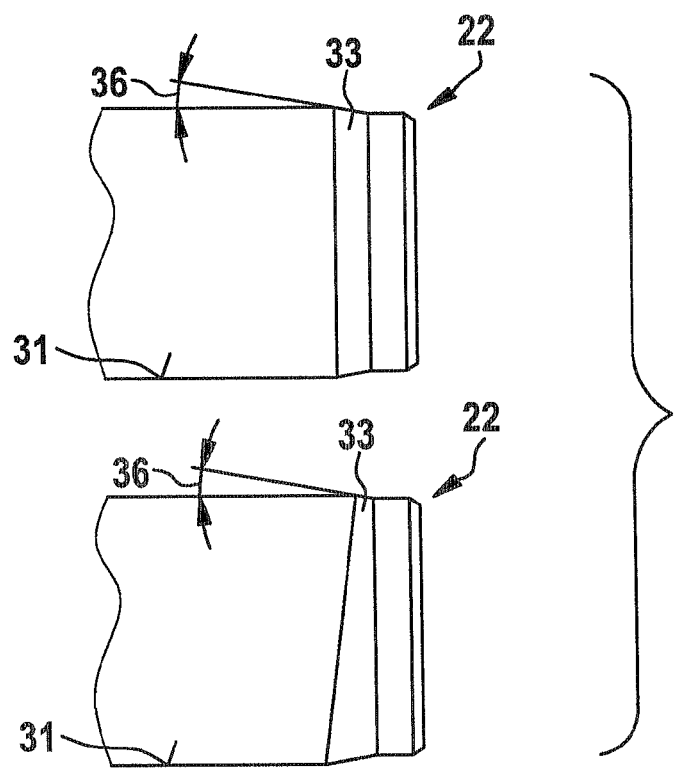
FIG. 5 shows two enlarged details of FIGS. 3 and 4.
Figure 6:
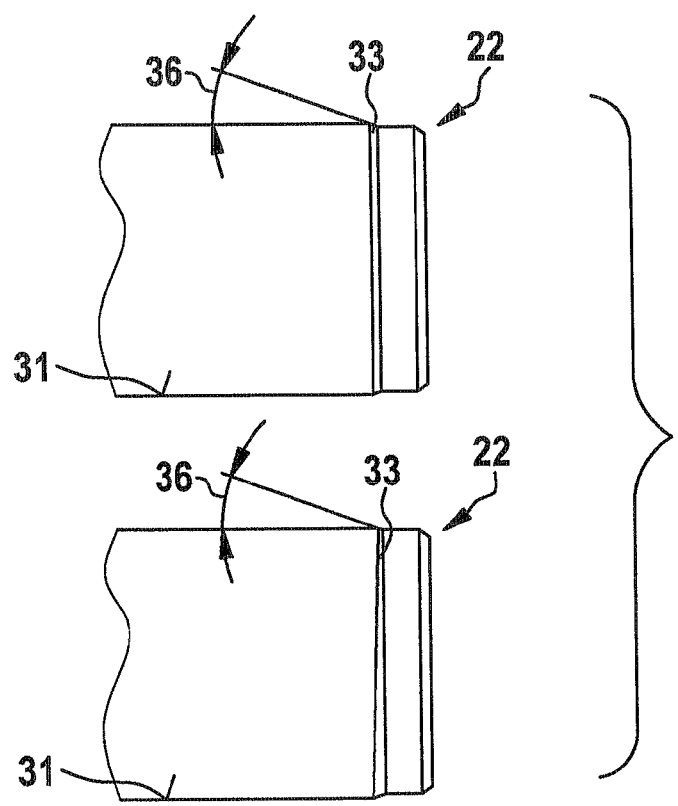
FIG. 6 shows an illustration similar to FIG. 5, with an insertion chamfer angle of approximately 20 degrees.

In FIG. 5, the influence of the coaxiality error is shown, for an insertion chamfer angle 36 of 5 degrees plus or minus 1 degree. In FIG. 6, in comparison, the influence of the coaxiality error is shown for an insertion chamfer angle 36 of 20 degrees plus or minus two degrees.

Figure 7:
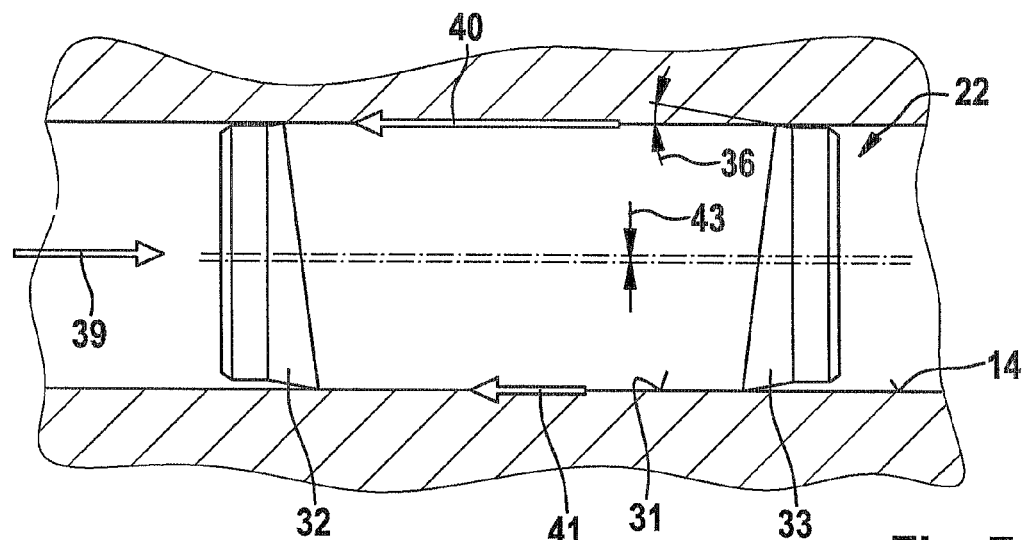
FIG. 7 shows an illustration of the effect of a different press-fit face distribution.

In FIG. 7, the spring retaining sleeve 22 is shown on being press-fitted into the receiving bore 14. The press-fitting direction is indicated by an arrow 39. Further arrows 40 and 41 indicate forces which result because of an existing coaxiality error 43 of 0.025. The different magnitudes of the forces 40 and 41 are due to a different press-fitting face distribution that is the result of the coaxiality error 43. Because of the different distribution of the press-fitting forces, tilting and torques can occur during the press-fitting operation.

By means of the choice according to the invention of an insertion chamfer angle 36 of 18 to 22 degrees, and in particular of approximately 20 degrees, it can be ensured in simple way that the press-fitted spring retaining sleeve, which is also known as a spring holder, maintains its position and does not slip during its entire service life. As a result, a necessary flow rate can be ensured during operation of the high-pressure valve.

The prestressing of the valve spring and thus the opening pressure of the high-pressure valve are set by means of the geometry of the spring holder or spring retaining sleeve. So that the spring retaining sleeve will not change its position over its entire service life, the press-fit assembly must be sufficiently certainly capable of absorbing the incident flow forces, which increase with an increasing flow rate; these flow forces can be greater than 2000 Newtons during the valve opening and valve closing operations.

The forces of the press-fit assembly to be absorbed can be increased, for example by the length of the press-fit assembly and by the press-fit diameter and a resultant press-fit oversize of the partners in the press-fit. If the press-fit assemblies are too long, uniformly supplying lubricant, in particular oil, to the entire press-fitting length during the press-fitting operation can prove difficult.

Within the context of the present invention, a percentage of 35 percent was found as a limit value for the ratio of press-fit diameter to press-fitting length. In other words, for a press-fitting length of 9 mm, the limit diameter is approximately 5.85 mm. At 60 percent, the limit diameter is 3.6 mm. If the limit diameter is exceeded, there is the danger of variously distributed and locally increased coefficients of friction. The result can be jittering effects and in the final analysis unwanted seizing during the press-fitting operation.

Moreover, in the relatively long press-fit assemblies discussed above, an unwanted influence of coaxiality errors occurs to an increased extent. Because of the unavoidable coaxiality errors, not only the aforementioned jittering effects and seizing effects during the press-fitting operation, but also an undesirably high mechanical load on an assembly device used for the press-fitting occur. Beyond a certain press-fitting oversize, the weaker partner in the press-fit moreover becomes plastically deformed. A purely elastic press-fit assembly, by comparison, has the advantage that elongation effects, which can occur for example with temperature differences, can be partly compensated for.

Figure 8:
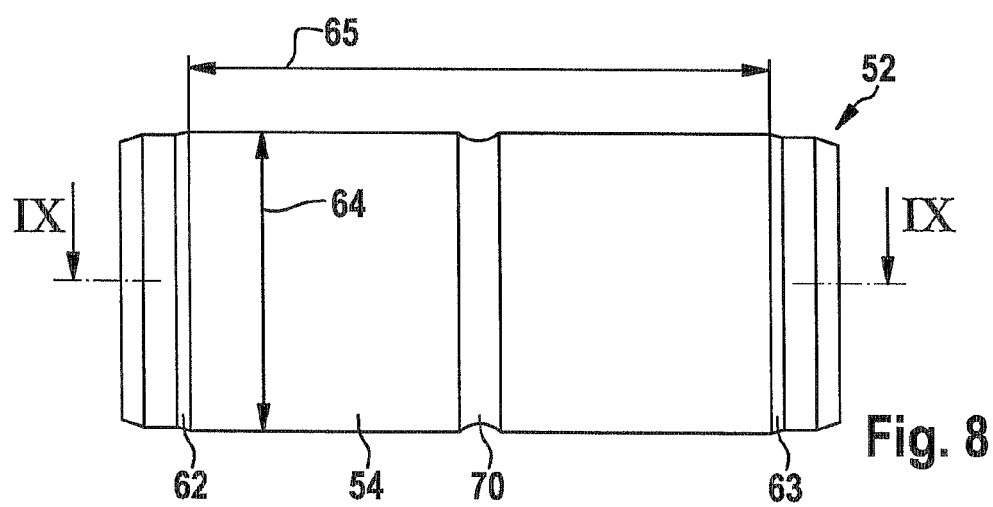
FIG. 8 shows a spring retaining sleeve in a further exemplary embodiment, with a lubrication groove.
Figure 9:
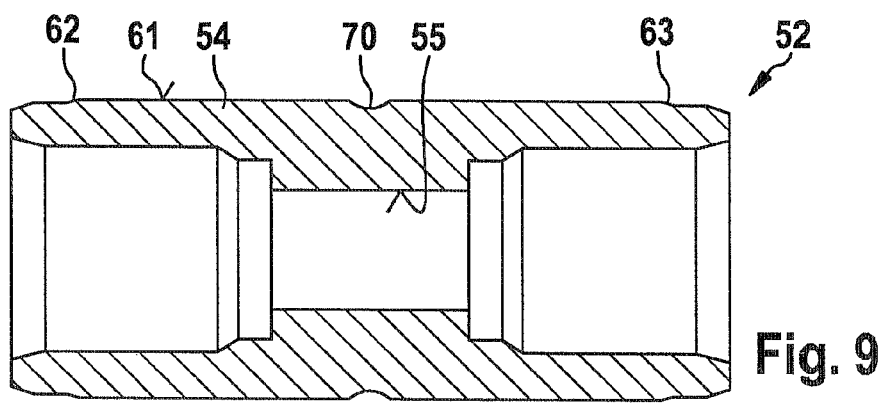
FIG. 9 shows a section taken along the line IX-IX in FIG. 8.

In FIGS. 8 and 9, a spring retaining sleeve 52 with a base body 54 is shown in various views. The base body 54 includes a central through hole 55. The base body 54 furthermore includes a cylinder press-fit connection surface 61, which on each of its ends has a respective insertion chamfer 62, 63. The press-fit diameter is indicated by a dimensioning line 64. The press-fitting length of the press-fit connection surface 31 is indicated by a further dimensioning line 65.

In the exemplary embodiment shown in FIGS. 8 and 9, a lubrication groove 70, which is embodied as an encompassing annular groove, is provided in the center of the cylinder press-fit connection surface 61. The annular groove has a cross section that has the shape of a circular arc. As the spring retaining sleeve 52 is being press-fitted, the lubrication groove 70 represents a lubricant reservoir, in particular an oil reservoir, which dispenses lubricant during the press-fitting operation. As a result, a virtually constant friction during the press-fitting can be ensured.

The foregoing relates to the preferred exemplary embodiments of the invention, it being understood that other variants and embodiments thereof are possible within the spirit and scope of the invention, the latter being defined by the appended claims.

The invention claimed is:

1. A spring retaining sleeve, comprising:
   a cylinder press-fit connection surface which has a press-fit diameter and a press-fitting length; and
   an optimized insertion chamfer provided on at least one end of the cylinder press-fit connection surface, for long press-fit assemblies having a ratio of press-fit diameter to press-fitting length that is greater than 35 percent, wherein
   the insertion chamfer has an angle in a range from 18 to 22 degrees, and
   the cylinder press-fit connection surface has only a single annular lubrication groove substantially in a center of the cylinder press-fit connection surface forming a lubricant reservoir to dispense lubricant during a press-fitting operation.

2. The spring retaining sleeve as defined by claim 1, wherein the lubrication groove extends in a circumferential direction of the cylinder press-fit connection surface.

3. The spring retaining sleeve as defined by claim 1, wherein the lubrication groove, in cross section, has a circular arc shape.

4. The spring retaining sleeve as defined by claim 2, wherein the lubrication groove, in cross section, has a circular arc shape.

5. The spring retaining sleeve as defined by claim 1, wherein a spring is configured to extend inside the cylinder press-fit connection surface.

6. The spring retaining sleeve as defined by claim 1, wherein the at least one lubrication groove is annular.

* * * * *